THREE LEVEL LOGICAL CIRCUIT SUITABLE FOR SIGNAL COMPARISON

Filed Dec. 14, 1959 4 Sheets-Sheet 1

INVENTOR
DONALD S. SWALLOW

BY Geoffrey Knight
ATTORNEY

INVENTOR
DONALD S. SWALLOW
BY Geoffrey Knight
ATTORNEY

THREE LEVEL LOGICAL CIRCUIT SUITABLE FOR SIGNAL COMPARISON

Filed Dec. 14, 1959 4 Sheets-Sheet 3

INVENTOR
DONALD S. SWALLOW

BY Geoffrey Knight
ATTORNEY

THREE LEVEL LOGICAL CIRCUIT SUITABLE FOR SIGNAL COMPARISON

Filed Dec. 14, 1959 4 Sheets-Sheet 4

INVENTOR
DONALD S. SWALLOW
BY Geoffrey Knight
ATTORNEY

United States Patent Office 3,130,324
Patented Apr. 21, 1964

3,130,324
THREE LEVEL LOGICAL CIRCUIT SUITABLE FOR SIGNAL COMPARISON

Donald Sherman Swallow, San Jose, Calif., assignor to International Business Machines Corporation, New York, N.Y., a corporation of New York Filed Dec. 14, 1959, Ser. No. 860,063
10 Claims. (Cl. 307—88.5)

This invention relates to a means for comparing signals. More particularly, this invention relates to a means for detecting differences among series of signals.

It is often desirable that two or more series of pulses be synchronized. The pulses may be of equal duration, or they may be of different duration with either leading or trailing edges in phase. Variable delay lines may be placed in each of the circuits transmitting the pulses, and may be manually adjusted until the pulses are brought into synchronization. The cathode-ray oscilloscope is useful for observing this adjustment. Perfect synchronization by this method requires constant manual monitoring and adjustment as well as accurate equipment. The invention disclosed in this application achieves accurate synchronization of two or more series of pulses automatically.

Automatic pulse synchronization may be obtained by the use of a servo-mechanism. If one series of pulses is designated as a reference, then other series of controllable pulses may be synchronized with the reference pulses by means of controlled servo-motors attached to variable delay lines placed in series with the controllable pulses. Each servo-motor adjusts the associated variable delay line under the control of an error signal proportional to the amount of a synchronization between the reference pulses and the selected series of controllable pulses. In order to generate this error signal, it is necessary to provide some way of detecting the difference between two series of signals. The difference should be expressed in terms of both magnitude and direction. This application discloses means for generating such an error signal.

Magnetic tape units associated with computers often have several parallel channels of information on each tape. For each channel, there must be provided a head which converts the magnetic information on the tape into electrical signals usable by the computer. The same head may also be used to record electrical signals from the computer as magnetic signals on tape. The time, or phase, relationship among the signals in each of the channels must be preserved during these transfers. Among the causes of difference in time relationship are mechanical misalignment of the heads, misalignment of the tape, and non-uniform electronic circuitry.

Timing control may be achieved by inserting one variable delay line in series with each channel. If one channel is chosen as a reference, each other channel's delay line may be varied in turn to bring all the signals into synchronization. If the reference channel and a chosen controllable channel are connected to an error detector, one servo-motor may be used to drive the chosen channel's delay line to the proper position. Thus, an error signal is required to drive the servo-motor in one direction to compensate for a lagging channel and in the opposite direction to compensate for a leading channel. The magnitude of the error signal could advantageously be dependent upon the degree to which the channel leads or lags the reference. In this application there is described an error detector having three outputs for every two inputs. One output carries magnitude information and the other two carry direction information. The magnitude information is obtained from a comparator which has an output dependent upon the relationship of its inputs. The servo-motor is driven at a rate dependent upon the magnitude information, in a direction determined by the direction outputs.

Accordingly, among the objects of my invention are:

(1) To provide a device for distinguishing, by the polarity of an output, which inputs are activated.

(2) To provide a device for distinguishing, by the polarity changes of an output, the time relationship among pulses applied to inputs.

(3) To employ AND and OR circuits in a manner to produce outputs which signify by their polarities and duration the condition of inputs.

(4) To achieve output magnitudes, from a comparator, dependent upon the time relationship among inputs.

The foregoing and other objects, features and advantages of the invention will be apparent from the following more particular description of preferred embodiments of the invention, as illustrated in the accompanying drawings.

The novel device forming this invention is a comparison device having a number of inputs and an output. In the version described in this application, the output is present only when one or the other of two inputs is alone present. There is no output from the comparator when both inputs are present. The polarity of the output indicates which of the inputs is present. The comparator may be described as an EXCLUSIVE OR circuit which has an output polarity determined by which input is present. In addition to phase control applications, this invention may be used to control speed, detect differences among more than two pulses, detect deviations beyond set amounts and generally to compare pulses.

For example, in tape skew control a reference channel may be one input and a selected controllable channel may be another input. If the signal pulses on the channels are synchronized and of the same duration there is no output from the comparator. If the controllable channel pulses lag the reference channel pulses, the output pulses will be of a given polarity first and the opposite polarity second. This occurs because the leading pulse alone controls the output first, and the lagging pulse alone controls the output last. Conversely, if the controllable channel pulses lead the reference channel pulses the output pulses' polarities will be in the reverse order. Further, the magnitude of the output pulses may be made dependent upon the amount that the controllable channel leads or lags the reference channel.

A servo-motor can utilize this error information if a direction control is provided to recognize the order of occurrence of output pulse polarities. One manner of accomplishing this recognition is by generating two series of pulses from the reference channel which are timed to occur in sequence just before each reference channel pulse ends. The earlier of these pulses can be used to reset a flip-flop and the second to sample a gate, connecting the comparator output and the flip-flop. Thus the flip-flop is set only if the comparator output pulse polarities occur in one order.

Figure 1:
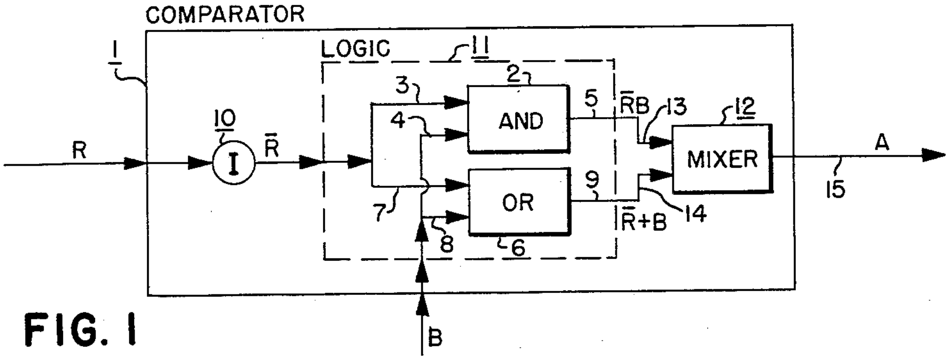
FIG. 1 is a block diagram of the invention.
Figures 4, 4A:
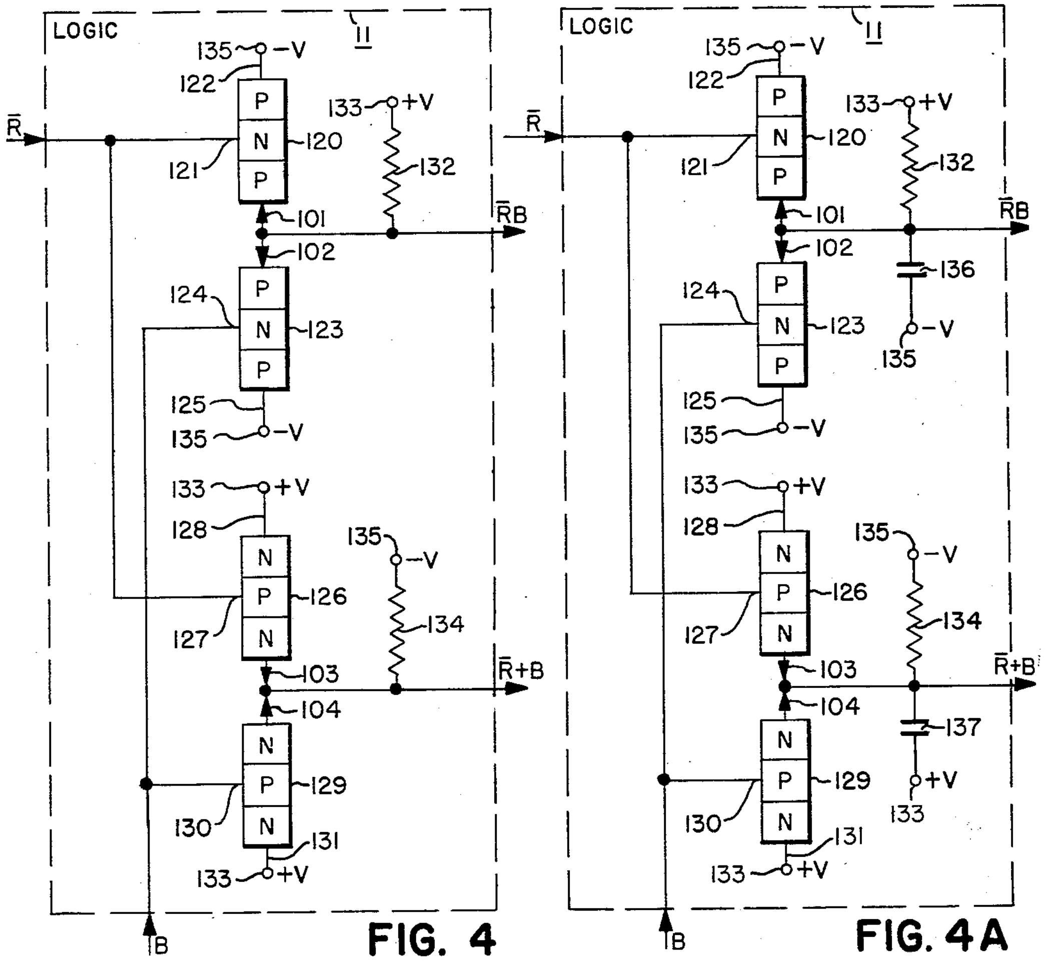

FIG. 4 and *4a* are circuit diagrams of still other embodiments of the part of the invention outlined by dashes in FIG. 1.

Figure 5:
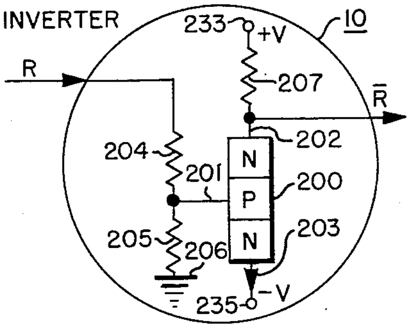

FIG. 5 is a circuit diagram of an inverter, that may be used in the invention shown in FIG. 1.

Figure 6:
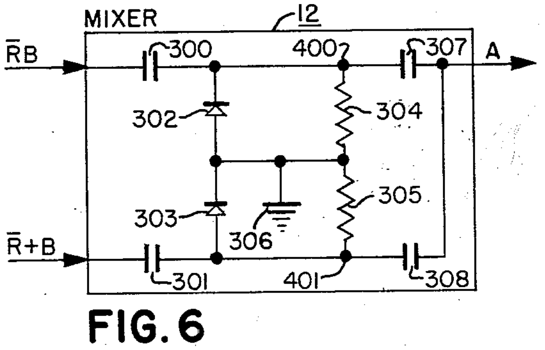

FIG. 6 is a circuit diagram of a mixer that may be used in the invention shown in FIG. 1.

Figure 7:
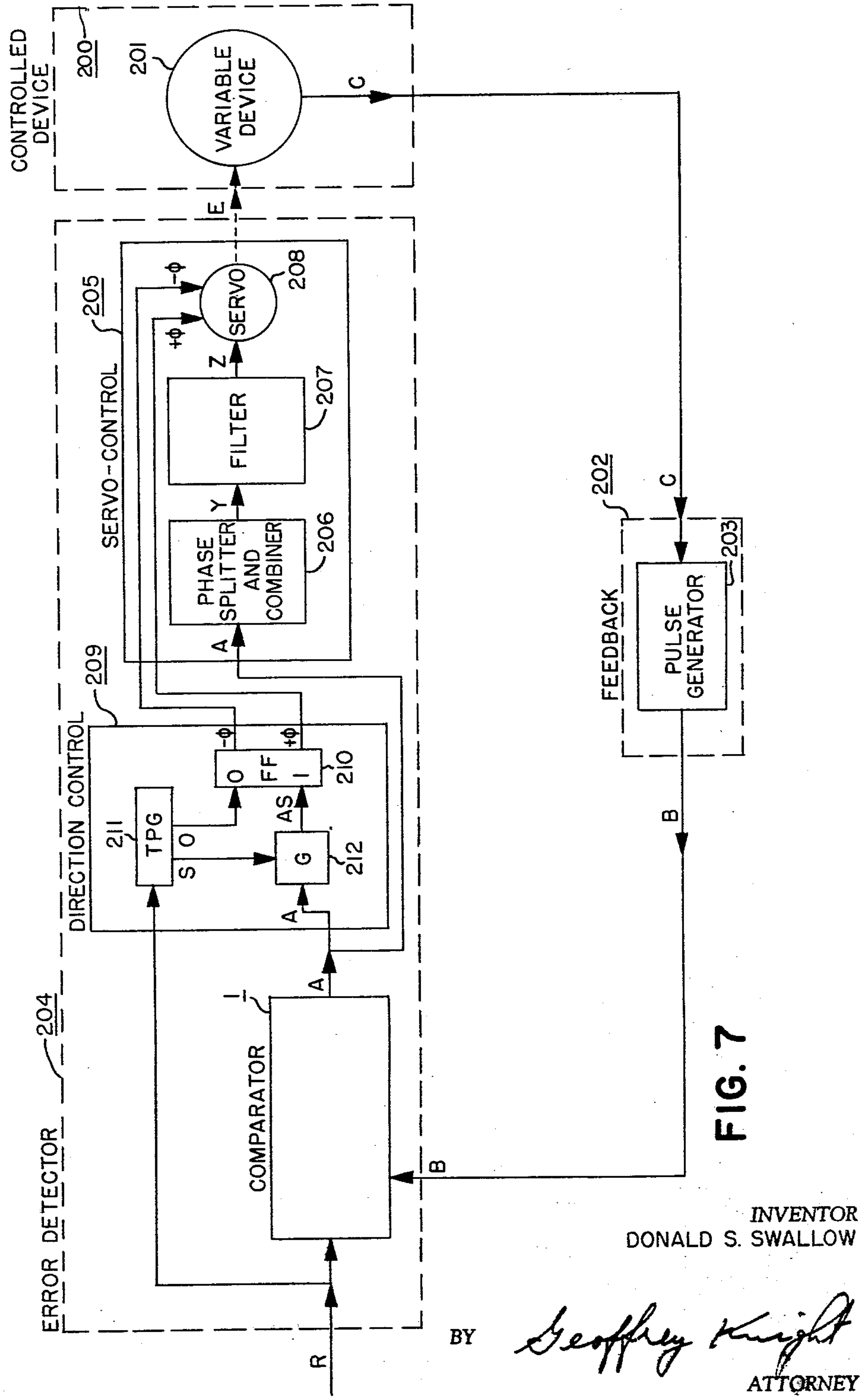

FIG. 7 is a block diagram of a servo-system using the invention shown in FIG. 1.

FIGS. *8a* to *8k*, *8m* and *9a* to *9e* are diagrams of waveforms present at specific points in the above FIGS. 1 to 7.

DESCRIPTION OF INVENTION

Referring to FIG. 1, the comparator 1 has a reference input R, a feedback input B, and an output A. The inputs R and B have signals impressed upon them that are either Up or Down. The output A is either Up, Down or Zero depending upon the conditions of the inputs R and B, as shown in Table I.

*Table I*

| R | B | A |
|---|---|---|
| Up | Up | 0 |
| Up | Down | Down |
| Down | Up | Up |
| Down | Down | 0 |

Thus it is seen that the output of comparator 1 indicates by its polarity which of the inputs R and B is alone present.

Figures 8A, 8B, 8C, 8D, 8E, 8F, 8G, 8H, 8I, 8J, 8K, 8M:
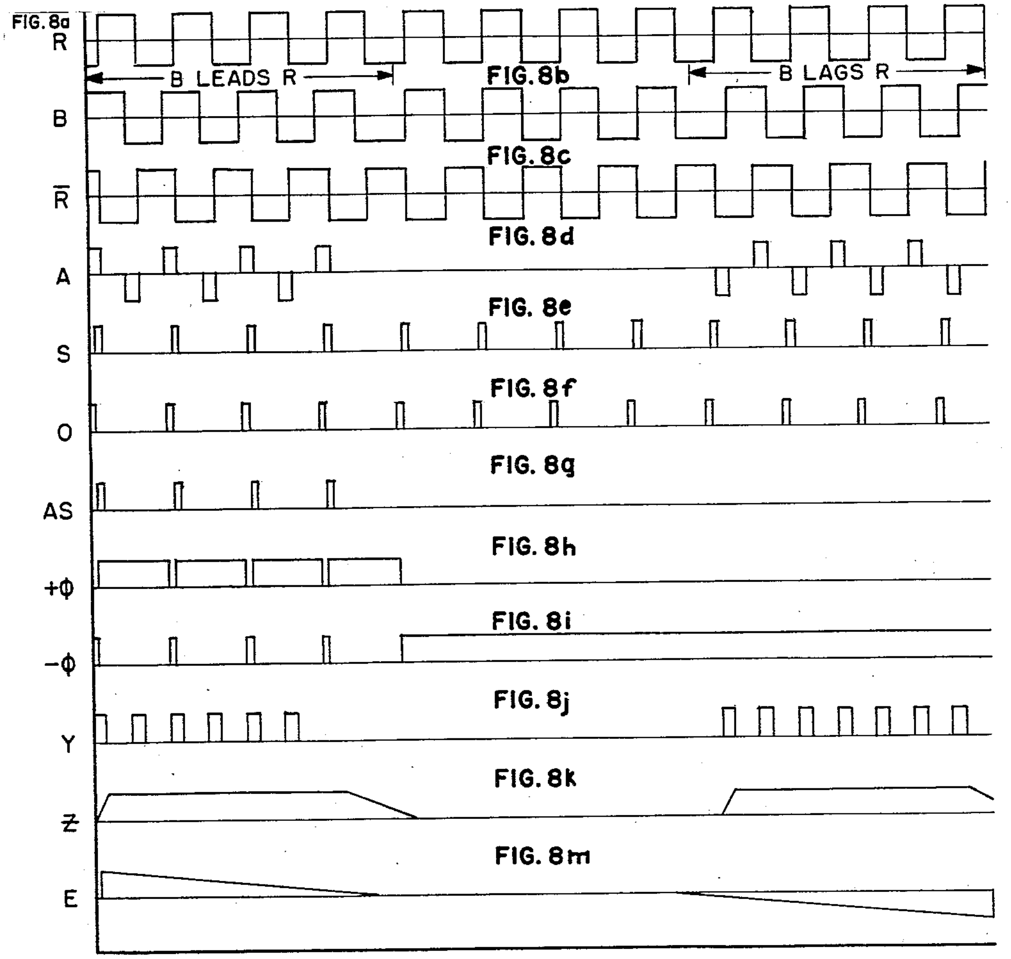

In FIGS. 8*a*, 8*b*, and 8*d*, if the series of Up and Down pulses shown in FIG. 8*a* is applied to input R, and the series of Up and Down pulses shown in FIG. 8*b* is applied to input B, then a series of Up and Down pulses obeying the rules of Table I will emerge from output A. As shown in FIG. 8*d*, there are no output pulses from output A when the input pulses to inputs R and B are coincident. This is because R is Up whenever B is Up, and Down whenever B is Down.

If the pulses applied to input B lead the pulses applied to input R, then input B is, by definition, Up for a period while R is Down. This period is the difference between the times of the leading (left) edges of the pulses applied to inputs R and B, and is represented at the output A as an Up pulse of the same period. Similarly, there will be Down pulses at the output A representing the time between the trailing (right) edges of the pulses applied to inputs R and B when R is Up and B is Down. In summary, when the pulses applied to the input B lead the pulses applied to the input R, an Up pulse followed by a Down pulse is said to emerge from the output A. The pulses at the output A will have widths determined by time relationship of the pulses applied to inputs R and B. The more the pulses applied to input B lead the pulses applied to input R, the greater will be the spacing between leading edges (and trailing edges) and the wider will be the resulting pulses at output A.

If the pulses applied to input B lag the pulses applied to input R, then the pulses appearing at the output A will be in the reverse order: a Down pulse followed by an Up pulse. The width of these pulses at output A will again be dependent upon the spacing between the pulses applied to the inputs R and B. Reference to FIGS. 8*a*, 8*b* and 8*d* shows that when the pulses applied to input B lag the pulses applied to input R there will always be a time period between the occurrences of the leading edges, when the pulses emerging from output A must be Down because input R is then Up and input B is then Down. During the interval between trailing edges, output A will be Up, because then input R is Down and input B is Up.

In summary, if the pulses applied to input B lead those applied to input R, then there will emerge from output A, a series of pulses first Up and then Down. The reverse order will emerge if the pulses applied to input B lag those applied to input R. This is shown in Table II.

*Table II*

| B | A | |
|---|---|---|
| | First | Second |
| Leads R | Up | Down |
| Lags R | Down | Up |
| In Phase | Zero | |

The width of the pulses will depend upon the amount of lead or lag, increasing with larger amounts of lead and lag.

Figures 9A, 9B, 9C, 9D, 9E:
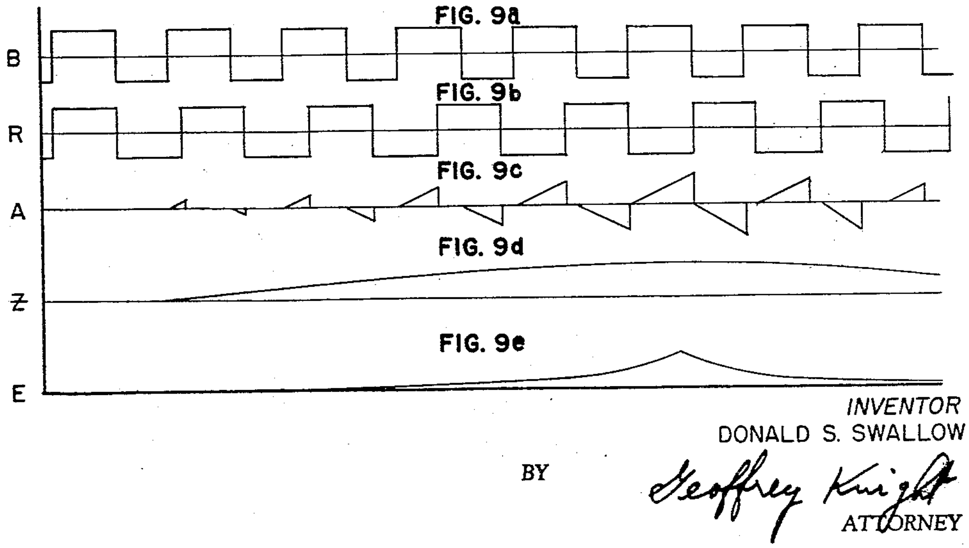

The output A of comparator 1 cannot respond immediately to its inputs R and B. Every physical device has an inherent response time. This response time may prevent the pulses emerging from output A from ever reaching their maximum value. That is, the edges will be sloped instead of perpendicular, as shown in FIG. 9*c*. The wider the pulse, the taller the pulse will be. This is utilized in the version of the comparator 1, utilizing the logic shown in FIGS. 3 and 4*a*.

In FIGS. 9*a*, 9*b* and 9*c*, the pulses applied to input B are shown as increasingly leading the pulses applied to input R. As was explained above, when the amount of lead increases, the width of the pulses at the output A should increase. FIG. 9*c* shows that if the response time of comparator 1 is substantially longer than the duration of the pulses at the inputs R and B, then the pulses at the output will have amplitudes determined by their duration. Therefore, in addition to the characteristics summarized above, the pulses at output A may have amplitudes determined by the amount that the pulses applied to input B lead, or lag, the pulses applied to input R.

DESCRIPTION OF COMPONENTS USED

Referring to FIG. 1, there is shown an AND block 2 having two inputs 3 and 4, and an output 5. The output 5 of the AND block 2 is Up only when both inputs 3 and 4 are Up. Otherwise output 5 is Down. OR block 6 has two inputs 7 and 8, and an output 9. The output 9 of OR block 6 is Up whenever either input 7 or 8 is Up. This is true if input 7 is alone Up, input 8 is alone Up or if both inputs 7 and 8 are together Up. Therefore, output 9 is Down only when both inputs 7 and 8 are Down. Input 4 of AND block 2 and input 8 of OR block 6 together connect to the input B of comparator 1. An inverter 10 having an input R and an output $\overline{R}$ connects the input R of comparator 1 with both input 3 of AND block 2 and input 7 of OR block 6. The function of the inverter is to change Up pulses to Down pulses and Down pulses to Up pulses.

A logic block 11 having inputs $\overline{R}$ and B, and outputs $\overline{R}B$ and $\overline{R}+B$, is formed by AND block 2 and OR block 6. If the input $\overline{R}$ is Up and the input B is Up, then the output $\overline{R}B$ will be Up. Otherwise the output $\overline{R}B$ is Down. If the input $\overline{R}$ is Down and the input B is Down, output $\overline{R}+B$ is Down. Otherwise output $\overline{R}+B$ is Up. See Table III.

*Table III*

| $\overline{R}$ | B | $\overline{R}B$ | $\overline{R}+B$ |
|---|---|---|---|
| Up | Up | Up | Up |
| Up | Down | Down | Up |
| Down | Up | Down | Up |
| Down | Down | Down | Down |

Mixer 12 has two inputs 13 and 14, and an output 15. The input 13 is connected to the logic block output $\overline{R}B$ and input 14 is connected to the logic block output $\overline{R}+B$. The output 15 of the mixer 12 is connected to the output A of the comparator 1. The function of the mixer is to mix Up and Down pulses present at its inputs 13 and 14. Thus, when inputs 13 and 14 are either both Up or Down, output 15 will be either Up or Down, in that order. If only one input is Up, and the other is Down, there will be no output. Re-examination of Table I will show what results are obtained by interconnecting logic block 11, mixer 12 and inverter 10. The signal applied at comparator input R appears as an inverted signal at output $\overline{R}$ of inverter 10. The logic block 11 produces signals at output $\overline{R}B$ and $\overline{R}+B$ which are related to the original inputs R and B, to the comparator 1, by the following logical expressions:

$$\text{Output } \overline{R}B=\overline{R}B$$

$$\text{Output } \overline{R}+B=\overline{R}+B=\overline{R\overline{B}}$$

The mixer 12 combines these signals to give a signal at output 15 which is the comparator output A. A will be Up when B alone is Up, and Down when R alone is Up. A is zero in all other cases. There is no conventional way of expressing such a novel three level logical statement; however, the invention may be described as an EXCLUSIVE OR circuit wherein the polarity of the output indicates which input is Up. This is an accurate description because an EXCLUSIVE OR output is activated only when one or the other of its inputs is activated.

Referring to FIGS. 8*a*, 8*b*, 8*c* and 8*d*, if the pulses of FIG. 8*a* are applied to input R of comparator 1, they will travel through inverter 10 to emerge at inverter output $\overline{R}$ as the pulses shown in FIG. 8*c*. The pulses of FIG. 8*c* are applied to the inputs 3 and 7 of the AND block 2 and OR block 6 within the logic block 11, while the pulses of FIG. 8*b* are applied, via comparator input B, to inputs 4 and 8. The pulses emerging at logic block outputs $\overline{R}B$ and $\overline{R}+B$ enter mixer 12 at inputs 13 and 14 respectively. Mixer output 15 is connected to comparator output A, the pulses emerging from output A being illustrated by FIG. 8*d* as explained in detail above. Also, as previously explained, if the response time of the comparator is substantially longer than the pulses applied to inputs R and B, then the pulses emerging at output A will have heights determined by the time relationship of the input pulses, as shown in FIG. 9*c*. The response time of the comparator 1 is determined by the design of inverter 10, AND block 2, OR block 6, mixer 12 and the stray reactances in the means interconnecting these circuits.

DIODE EMBODIMENT

Figure 2:
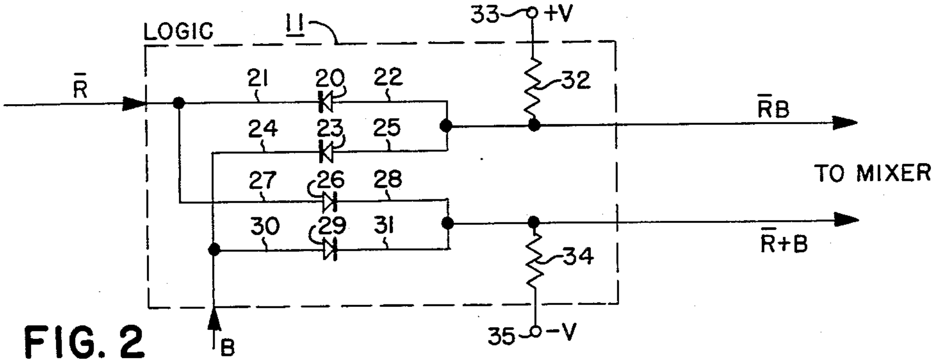
FIG. 2 is a circuit diagram of one embodiment of the part of the invention outlined by dashes in FIG. 1.

Referring to FIG. 2, one embodiment of the logic block 11, having inputs $\overline{R}$ and B, and outputs $\overline{R}B$ and $\overline{R}+B$, is shown. There are provided four diodes: diode 20 having an input 21 and an output 22; diode 23, oriented identically to diode 20, having an input 24 and an output 25; diode 26, oriented oppositely to diodes 20 and 23, having an input 27 and an output 28; and diode 29, oriented identically to diode 26, having an input 30 and an output 31. Logic block input $\overline{R}$ is connected to diode 20 through input 21, and to oppositely oriented diode 26 through input 27. Logic block input B is connected to diode 23 through input 24, and to oppositely oriented diode 29 through input 30. Diodes 20 and 23 are forward biased by potential source 33 through resistor 32 connected between potential source 33 and diode outputs 22 and 25. Logic block output $\overline{R}B$ is connected to the junction formed by resistor 32 and diode outputs 22 and 25. Diodes 26 and 29 are forward biased by potential source 35 through resistor 34 which is connected between potential source 35 and diode outputs 28 and 31. Logic block output $\overline{R}+B$ is connected to the junction of resistor 34 with diode outputs 28 and 31.

Note that both sets of diodes 20 and 23, and 26 and 29 are forward biased. Since the set formed by diodes 20 and 23 is oriented oppositely to the set formed by diodes 26 and 29, the polarity of potential source 33 is opposite to that of potential source 35. The directions of the four diodes have been arbitrarily chosen in FIG. 2. An Up level is any proper positive potential. A Down level is any proper negative potential. Depending upon the Up and Down potential levels of the pulses applied to inputs $\overline{R}$ and B, each of the potentials 33 and 35 may be almost any value and polarity. Only one set of possibilities is shown as an example.

In the example shown in FIG. 2 and for the pulses shown in FIG. 8*b* and 8*c*, the circuit formed by diodes 20 and 23, and resistor 32 functions as a standard AND circuit. The output $\overline{R}B$ can be Up only if neither diode

20 nor diode 23 conducts. Assuming that both inputs 21 and 24 are Up, then neither diode 20 nor diode 23 conducts, negligible current flows in resistor 32, and almost the entire potential source 33 appears at the output $\overline{R}B$ as an Up signal. If either input 21 or input 24 (or both), is Down then the respective diode 20 or 23 (or both) will conduct. The voltage drop across a conducting diode being negligible, output $\overline{R}B$ will be Down in all cases where either (or both), of diodes 20 and 23 conducts. The output $\overline{R}B$ will be Up only when both inputs 21 and 24 are Up. This is the AND function, performed by the AND block 2 of FIG. 1.

The diodes 26 and 29, and resistor 34 form a standard OR circuit, in the example of FIG. 2 and for the pulses of FIG. 8*b* and 8*c*. As long as neither diode 26 nor diode 29 conducts, the potential source 35 appears at the output $\overline{R}+B$ as a Down signal. This occurs only when both inputs 27 and 30 are Down. If either, or both, of inputs 27 or 30 are Up, one, or both, of diodes 26 and 29 will conduct, causing output $\overline{R}+B$ to be Up. This is the OR function, performed by the OR block 6 of FIG. 1.

The embodiment of logic block 11, shown in FIG. 2 may be interconnected with inverter 10 and mixer 12 in the manner previously explained with reference to FIG. 1. The response time of the comparator 1 may be decreased in many ways as previously mentioned. The version of logic block 11, shown in FIG. 3 illustrates one method.

Figure 3:
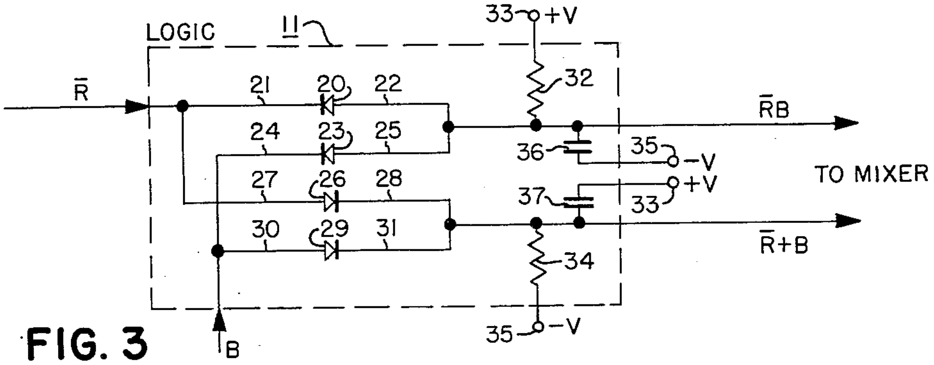
FIG. 3 is a circuit diagram of another embodiment of the part of the invention outlined by dashes in FIG. 1.

Referring to FIG. 3 there are added two capacitors to the version of FIG. 2: capacitor 36, connected between the output $\overline{R}B$ and potential source 35; and capacitor 37, connected between the output $\overline{R}+B$ and potential source 33. Whenever the outputs $\overline{R}B$ and $\overline{R}+B$ change from Up to Down, capacitor 36 must discharge and capacitor 37 must charge. If the outputs $\overline{R}B$ and $\overline{R}+B$ change from Down to Up, capacitor 36 must charge and capacitor 37 must discharge. The charge paths for capacitors 36 and 37 are through resistors 32 and 34 respectively. The discharge paths for capacitor 36 are through either diode 20 or 23 or both, depending which ones are conducting. Similarly, the discharge paths for capacitor 37 are through either diode 26 or 29 or both, depending upon which are conducting. Therefore it will take much longer for the capacitors 36 and 37 to charge than it will to discharge. The total result of this action, in the comparator 1, is shown in FIG. 9*c*. Instead of pulses at output A merely having widths determined by the time relationships of the pulses at inputs B and $\overline{R}$ (see FIG. 8*d*), the pulses will have amplitudes dependent upon how much time was available for the capacitors 36 and 37 to charge in their respective directions. The charging response time of the logic block 11 has been increased.

TRANSISTOR EMBODIMENT

FIGS. 4 and 4*a* show two transistorized versions of the logic block 11. The first version differs from the second only in the absence of capacitors 136 and 137.

In FIG. 4, PNP transistor 120 has a base 121, a collector 122 and an emitter 101, and PNP transistor 123 has a base 124, a collector 125 and an emitter 102. Emitter 102 and emitter 101 are connected together to potential source 133 through resistor 132. Both collectors 122 and 125 are connected to potential source 135. Output $\overline{R}B$ is taken from the junction of emitters 101 and 102 and resistor 132.

The NPN transistors 126 and 129 each have a base 127 and 130, a collector 128 and 131 and an emitter 103 and 104. The emitters 103 and 104 are connected together. Potential source 135 is connected to the emitters 103 and 104, through resistor 134. Collectors 128 and 131 are connected to potential source 133. Output $\overline{R}+B$ is taken from the junction of emitters 103 and 104 and resistor 134.

The input $\overline{R}$ is connected to bases 121 and 127, and the input B is connected to bases 124 and 130. The output $\overline{R}B$ is Up if neither transistor 120 nor transistor 123 is conductive. This situation exists only when both inputs 121 and 124 are Up. If either input 121 or 124 is Down, or if both input 121 and 124 are Down, then either transistor 120 or 123 (or both) will conduct, bringing the output $\overline{R}B$ Down. This is the AND function, performed by AND block 2 in FIG. 1.

Output $\overline{R}+B$ is Up whenever either transistor 126 or transistor 129 conducts or when both conduct. This occurs only when either base 127 or base 130 is Up or when both are Up. When both bases 127 and 130 are Down, then the output $\overline{R}+B$ is Down. This is the OR function, performed by OR block 6 of FIG. 1.

Referring to FIG. 4*a* another version of the logic block 11 shown in FIG. 4 is obtained by inserting capacitor 136 between the output $\overline{R}B$ and the potential source 135, and capacitor 137 between the output $\overline{R}+B$ and the potential source 133. As previously explained, for the circuit of FIG. 3, the charge and discharge times of the capacitors so increase the response time of the comparator 1, that the output A has a phase dependent amplitude.

INVERTER AND MIXER

Referring now to FIG. 5, there is shown an inverter 10 which may be used with the comparator 1 of FIG. 1. NPN transistor 200 has a base 201, a collector 202 and an emitter 203. The input R is applied to base 201 by means of a voltage divider made up of resistors 204 and 205. Resistor 204 is connected between input R and base 201, and resistor 205 is connected between base 201 and common return 206. Output $\overline{R}$ is taken from the collector 202. Resistor 207 is connected between collector 202 and potential source 233. Emitter 203 is connected to potential source 235. Whenever transistor 200 conducts, the output $\overline{R}$ is essentially the same as potential source 235 (i.e. Down). This occurs only when base 201 is positive, due to input R being Up. When input R is Down, transistor 200 is cut off, making output $\overline{R}$ essentially the value of potential source 233 (i.e. Up). This is the function of the inverter 10, in FIG. 1.

Referring to FIG. 6, there is shown a mixer 12 which may be used with the comparator 1, of FIG. 1. Inputs $\overline{R}B$ and $\overline{R}+B$ are connected to coupling capacitors 300 and 301, respectively. These coupling capacitors reject steady state potentials, passing only changes in the potential value of the inputs. Diodes 302 and 303 are connected between the remaining ends of coupling capacitors 300 and 301, respectively, and common return 306. Diode 302 limits potentials at junction 400 to positive values. If a negative potential appears, diode 302 conducts, prohibiting junction 400 from dropping to a negative value. Similarly diode 303 conducts whenever a positive potential appears at junction 401. Therefore capacitors 300 and 301, together with diodes 302 and 303, set the reference potential at zero. Resistors 304 and 305 are connected in series between junctions 400 and 401. The junction of resistor 304 with resistor 305 is connected to common return 306. Capacitors 307 and 308 together with resistors 304 and 305 function as a linear voltage divider. When junction 400 is Up and junction 401 is zero (due to conduction of diode 303), output A is Up. When junction 400 is zero (due to conduction of diode 302) and junction 401 is Down, output A is Down. If both junctions 400 and 401 are zero, then output A is zero. This is the function of the mixer 12 in FIG. 1.

DESCRIPTION OF OPERATION

Referring now to FIG. 7, FIGS. 8*a* to 8*k*, and 8*m* and FIGS. 9*a* to 9*e*, the operation of the invention in a servo-system will be described.

In FIG. 7 controlled device 200 may comprise any variable device 201 having an output C controllable by an error input E. For example, variable device 201 may be an airplane rudder, with mechanical inputs and outputs or, it may be an automatic voltage controller with electrical inputs and outputs. For purposes of illustration, variable device 201 may be viewed as a tape channel having an electrical output C, and a mechanical error input E. The mechanical input E varies the timing of the electrical output C by any of a number of means, such as a variable delay line placed in series with the tape channel and the output C.

Output C is passed through feedback circuit 202 having output B. Feedback circuit 202 transforms input C to the proper magnitude, form and phase necessary for the system to function. In this illustration, feedback circuit 202 is a pulse generator 203 which generates one properly formed pulse at output B, upon the receipt of any pulse at input C, thus compensating for deformation of tape channel pulses.

Output B is compared with reference input R in error detector 204 having an output E sufficient to compensate controlled device 200 for any variance between the error detector inputs R and B. The pulse generator 203 output B is compared with the reference input R in the comparator 1. The electrical output A of the comparator 1 is converted to a mechanical error output E by the servo control circuit 205. The servo control circuit 205 consists of a phase splitter and combiner 206, a filter 207 and a servo motor 208. A phase splitter is here defined as a circuit that divides one partly positive and partly negative signal "A" into two positive signals: one equivalent to the positive portions of the input signal, the second equivalent to the negative portions of the input signal. A combiner is defined as a circuit which combines two signals into one signal "Y." A filter is defined as a circuit which removes undesired variations from an input signal "Y." And, a servo-motor translates an electrical signal "Z" into an equivalent amount of mechanical rotation E. The directional control 209 utilizes the comparator output A and the reference input R to determine in which direction the servo-motor 208 will rotate. The servo-motor 208 has three inputs: input Z controls the speed that the servo-motor 208 will rotate in either of two directions determined by which one of inputs $+\phi$ or $-\phi$ is activated. Flip-flop 210 in direction control 209 activates either input $+\phi$ or $-\phi$ depending upon which of its inputs 0 or 1 are set. Time pulse generator 211 periodically sets flip-flop 210 to "O" with pulse "O" and then immediately samples gate 212 with pulse "S." If a signal is present at comparator output A, then the gate 212 will pass the signal at comparator output A to set flip-flop 210 to 1.

Flip-flop 210 will be set at 0, activating output $-\phi$, at all times, unless time pulse generator output S coincides with a signal at comparator output A. In such a case the flip-flop 210 will be set to 1, activating output $+\phi$. Flip-flop 210 is returned to 0 by time pulse generator 211 periodically, but stays at 0 only if the subsequent sampling of gate 212 by pulse "S" does not coincide with a signal at comparator output A.

FIGS. 8a to 8k and 8m show the signals present at various points of the system shown in FIG. 7 for the embodiment of comparator 1 wherein comparator output A is either Up or Down. FIGS. 9*a* to 9*e* show the signals present at selected points of the system shown in FIG. 7, for the embodiment of comparator 1 wherein comparator output A has an amplitude determined by the condition of its inputs R and B.

In FIGS. 8a to 8k and 8m the pulses "R" are taken as a reference and the pulses "B" are automatically varied to coincide with the reference pulses. The pulses "B" may either lead, lag or be in phase with the pulses "R." The comparator output pulses "A" occur in the order positive and then negative if B leads R, and in the order negative and then positive if B lags R. There is no output A if B is in phase with R. Pulses "S" and "O" are generated by time pulse generator 211 under control of pulses "R." A pulse "S" occurs just before R rises; and, a pulse "O" occurs just before each pulse "S." A pulse "AS" which sets flip-flop 210 to "1," occurs only when pulses "A" and "S" coincide. This condition exists only when B leads R. Thus output $+\phi$ is activated by each pulse "S" as long as B leads R. Each pulse "O" activates output $-\phi$ for the period of pulse "O," but pulse "S" immediately reactivates output $+\phi$. Output $+\phi$ controls the direction of rotation of servo-motor 208 to properly adjust variable device 201, bringing pulses "B" into coincidence with pulses "R." If B lags R, then flip-flop 210 will always activate output $-\phi$ for pulses "S" will never coincide with pulses "A" to set the flip-flop 210 from "0" to "1." Servo-motor 208 will then adjust variable device 201 in the opposite direction until input B is coincident with input R.

The amount of adjustment by servo-motor 208 will depend upon the width of comparator output pulses A, which in turn depends upon the extent that input B leads or lags reference input R. Pulses "A" are converted to pulses "Y" by phase-splitter and combiner 206 and to levels Z by filter 207. FIG. 8*k* shows levels Z for one leading, one lagging and one coincident condition. Depending upon the effectiveness of filter 207, the amplitude of level Z will to some extent depend upon the amount that input B differs from input R. The greater the difference, the greater the level.

The angular position E of servo-motor 208 is determined by its inputs $+\phi$, $-\phi$ and Z. If the input Z is zero, then regardless of the inputs $+\phi$ and $-\phi$, the servo-motor 208 will be in a stationary position. For a fixed value of Z, it will be rotating in either of two directions dependent upon which input $+\phi$ or $-\phi$ is activated.

The speed of rotation of servo-motor 208 is determined by the magnitude of level Z. This may be made dependent upon the amount of lag or lead by employing a version of comparator 1 wherein the output A has a varying amplitude.

FIGS. 9*a* to 9*e* illustrate input B's being adjusted from coincident to leading, employing a version of comparator 1 with a variable amplitude output A. Thus the magnitude of level Z is greatest for the greatest lead. The angular position D of servo-motor 208 changes most rapidly when B leads R by the greatest amount.

There has been described a comparator comprising logic blocks in combination, usable in a servo-system error detector. Other uses of the comparator to control speed, detect differences among pulses, detect deviations beyond set amounts, etc., will be obvious to one skilled in the art. While the invention has been particularly shown and described with reference to preferred embodiments thereof, it will be understood by those skilled in the art that the foregoing and other changes in form and details may be made therein without departing from the spirit and scope of the invention.

What is claimed is:

1. A circuit for the comparison of a set of time varying electrical signals, said signals capable of residing in two polarity states about a reference level, comprising a first input terminal for accepting a first signal of said set of signals, a second input terminal for accepting a second signal of said set of signals, a first circuit means connected to said input terminals for providing an output signal of a first polarity only when said first signal and said second signal are coincidentally in one of said two polarity states, a second circuit means connected to said input terminals for providing an output signal of a second polarity only when said first signal and said second signal are coincidentally in the other of said two polarity states, a third circuit means connected to the outputs of said first and said second circuit means and adapted to pass only output signals of said first polarity from said first circuit means and only output signals of said second polarity from said second circuit means, thereby to produce, by having passed either polarity output signal or having passed no output signal, a three level output signal which indicates the polarity coincidence relationship between said first and said second signals.

2. A circuit for the comparison of a set of time varying electrical signals, said signals capable of residing in two polarity states about a reference level, comprising, a first input terminal for accepting a first signal of said set of signals, a second input terminal for accepting a second signal of said set of signals, signal inversion means connected to said first input terminal and having an output, a first circuit means connected to both said signal inversion means output and said second input terminal for providing an output signal of a first polarity only when the inverted first signal and said second signal are coincidentally in one of said two polarity states, a second circuit means connected to both said signal inversion means output and said second input terminal for providing an output signal of a second polarity only when said inverted first signal and said second signal are coincidentally in the other of said two polarity states, a third circuit means connected to the outputs of said first and said second circuit means and adapted to pass only output signals of said first polarity from said first circuit means and only output signals of said second polarity from said second circuit means, thereby to produce, by having passed either polarity output signal or having passed no output signal, a three level output signal which indicates the polarity non-coincidence relationship between said first and said second signals.

3. A signal comparison circuit as described in claim 1 further comprising, means for varying the magnitude of said three level output signal to indicate the duration of said polarity coincidence relationship between said first and said second signals, said means comprising a fourth circuit means connected to said signal comparison circuit and variably responsive to the duration of signals after said signals have been processed by said first and said second circuit means.

4. A signal comparison circuit as described in claim 2 further comprising, means for varying the magnitude of said three level output signal to indicate the duration of said polarity non-coincidence relationship between said first and said second signals, said means comprising a fourth circuit means connected to said signal comparison circuit and variably responsive to the duration of signals after said signals have been processed by said first and said second circuit means.

5. A signal comparison circuit comprising:

a first, a second, a third, and a fourth transistor having respective base, collector, and emitter terminals;

first and second input means for supplying bipolar signals to be compared, said first input means being connected to the bases of both said first and said third transistors, said second input means being connected to the bases of both said second and said fourth transistors;

power supply means of a first polarity connected to the collectors of said first and said second transistors, and power supply means of a second polarity connected to the collectors of said third and said fourth transistors;

a first output means connected to the emitters of both said first and said second transistors for producing an output signal of a first polarity when, and as long as, said first and said second input means supply identical first polarity input signals to said first and said second transistors;

a second output means connected to the emitters of both said third and said fourth transistors for producing an output signal of a second polarity when, and as long as, said first and said second input means supply identical second polarity signals, whereby two random bipolar signal trains supplied by said first and second input means cause said first output means to produce a signal of a first polarity when, and as long as, said bipolar signal trains overlap in a first polarity, and causes said second output means to produce a signal of a second polarity when, and as long as, said bipolar signal trains overlap in a second polarity;

mixing means connected to said first and said second output means for passing only signals of a first polarity from said first output means, and only signals of a second polarity from said second output means, whereby said mixing means produce an output signal residing in a first polarity only when, and as long as, said bipolar signal trains overlap in a first polarity state, and of a second polarity only when, and as long as, said bipolar signal trains overlap in a second polarity state;

integrating means connected to said first and said second output means for integrating the duration of signals produced by said first and said second output means so that said mixing means pass signals of a variable amplitude which vary with the duration of the signals produced by said first and said second output means.

6. The combination according to claim 5 further including, signal inversion means connected between said first input means and the bases of said first and said third transistors.

7. A signal comparison circuit comprising:

a first, a second, a third and a fourth transistor having respective base, collector, and emitter terminals;

first and second input means for supplying bipolar signals to be compared, said first input means being connected to the bases of both said first and said third transistors, said second input means being connected to the bases of both of said second and said fourth transistors;

power supply means of a first polarity connected to the collectors of said first and said second transistors, and power supply means of a second polarity connected to the collectors of said third and said fourth transistors;

a first output means connected to the emitters of both said first and said second transistors for producing an output signal of a first polarity when, and as long as, said first and said second input means supply identical polarity input signals of a first polarity;

a second output means connected to the emitters of both said third and said fourth transistors for producing an output signal of a second polarity when, and as long as, said first and said second input means supply identical second polarity signals, whereby two random bipolar signal trains supplied by said first and second input means cause said first output means to produce a signal of a first polarity when, and as long as, said bipolar signal trains overlap in a first polarity, and causes said second output means to produce a signal of a second polarity when, and as long as, said bipolar signal trains overlap in a second polarity;

mixing means connected to said first and said second output means for passing only signals of said first polarity from said first output means, and only signals of said second polarity from said second output means, whereby said mixing means produce an output signal residing in a first polarity only when, and as long as, said bipolar signal trains overlap in a first polarity state, and of a second polarity only when, and as long as, said bipolar signal trains overlap in a second polarity state.

8. A signal comparison circuit comprising:

a first, a second, a third, and a fourth diode, each diode having a respective cathode and anode;

first input means and second input means, each for supplying a bipolar signal train to be compared, said first input means being connected to the cathode of said first diode and the anode of said third diode, said second input means being connected to the cathode of said second diode and the anode of said fourth diode;

first output means including a source of potential of a first polarity connected to the anodes of said first and said second diodes for producing an output signal of a first polarity only when, and as long as, said first and said second input means supply signals of an identical first polarity;

second output means including a source of potential of a second polarity connected to the cathodes of said third and said fourth diodes for producing an output signal of a second polarity only when, and as long as, said first and said second input means supply signals of an identical second polarity;

mixing means connected to said first and said second output means for passing only signals of said first polarity from said first output means and only signals of said second polarity from said second output means, whereby said mixing means produces an output signal residing in a first polarity only when, and as long as, said bipolar signal trains overlap in a first polarity, and produces an output signal residing in a second polarity only when, and as long as, said bipolar signal trains overlap in a second polarity.

9. Signal comparison circuit according to claim 8 further including integrating means connected to said first and said second output means for integrating the duration of the signals produced by said first and said second output means, whereby said mixing means pass signals of a variable amplitude which indicate the variable duration of the output signals from said first and said second output means.

10. Signal comparison circuit according to claim 9 further including, signal inversion means connected between said first input means and the cathodes of said first diode and the anode of said third diode.

References Cited in the file of this patent

UNITED STATES PATENTS

| | | |
|---|---|---|
| 2,636,133 | Hussey | Apr. 21, 1953 |
| 2,762,949 | Huffman | Sept. 11, 1956 |
| 2,866,092 | Raynsford | Dec. 23, 1958 |
| 2,879,411 | Faulkner | Mar. 24, 1959 |
| 2,892,099 | Gray | June 23, 1959 |
| 2,910,597 | Strong | Oct. 27, 1959 |
| 2,914,681 | Steele | Nov. 24, 1959 |